United States Patent [19]
Fally

[11] Patent Number: 5,870,895
[45] Date of Patent: Feb. 16, 1999

[54] COMPACT CLOSED-LOOP BRAYTON CYCLE ROTATING MACHINE, PROPULSION SYSTEM COMPRISING A MACHINE OF THIS KIND, AND VEHICLE PROVIDED WITH PROPULSION MEANS OF THIS KIND

[75] Inventor: Jacques Fally, Orsay, France

[73] Assignee: Alcatel Altshom Compagnie Generale D'Electricite, Paris, France

[21] Appl. No.: 749,785

[22] Filed: Nov. 15, 1996

[30] Foreign Application Priority Data

Nov. 16, 1995 [FR] France .................................. 95 13603

[51] Int. Cl.⁶ .................................................. F01K 11/00
[52] U.S. Cl. .............................................................. 60/669
[58] Field of Search ............................... 60/650, 682, 669

[56] References Cited

U.S. PATENT DOCUMENTS

| | | | |
|---|---|---|---|
| 2,079,923 | 5/1937 | Pavlecka | 60/668 |
| 3,236,052 | 2/1966 | Guin | 60/682 |
| 4,069,673 | 1/1978 | Lapeyre | 60/669 |

FOREIGN PATENT DOCUMENTS

| | | |
|---|---|---|
| 1165581 | 10/1958 | France . |
| 2212488 | 7/1974 | France . |
| 2289729 | 5/1976 | France . |
| 2751530A1 | 5/1979 | Germany . |
| 856260 | 12/1960 | United Kingdom . |
| 1083150 | 9/1967 | United Kingdom . |
| WO9505529 | 2/1995 | WIPO . |

*Primary Examiner*—Noah P. Kamen
*Attorney, Agent, or Firm*—Sughrue, Mion, Zinn, Macpeak & Seas, PLLC

[57] ABSTRACT

A closed-loop Brayton cycle rotating machine is provided with a sealed circuit in which a working fluid flows. This circuit comprises a compressor for compressing the working fluid, a hollow cylindrical recovery heat exchanger for preheating the compressed working fluid, a H.T. boiler for heating the preheated compressed working fluid to a high temperature, a turbine for generating mechanical energy by expanding the compressed H.T. working fluid through the turbine, and downstream of and axially aligned with the turbine, an exhaust pipe for the expanded H.T. working fluid. The circuit is configured so that the expanded H.T. working fluid constitutes a heat source of the recovery heat exchanger. The boiler is in the general shape of a hollow cylinder and is interposed coaxially between the axial turbine/exhaust pipe assembly and the recovery heat exchanger.

23 Claims, 5 Drawing Sheets

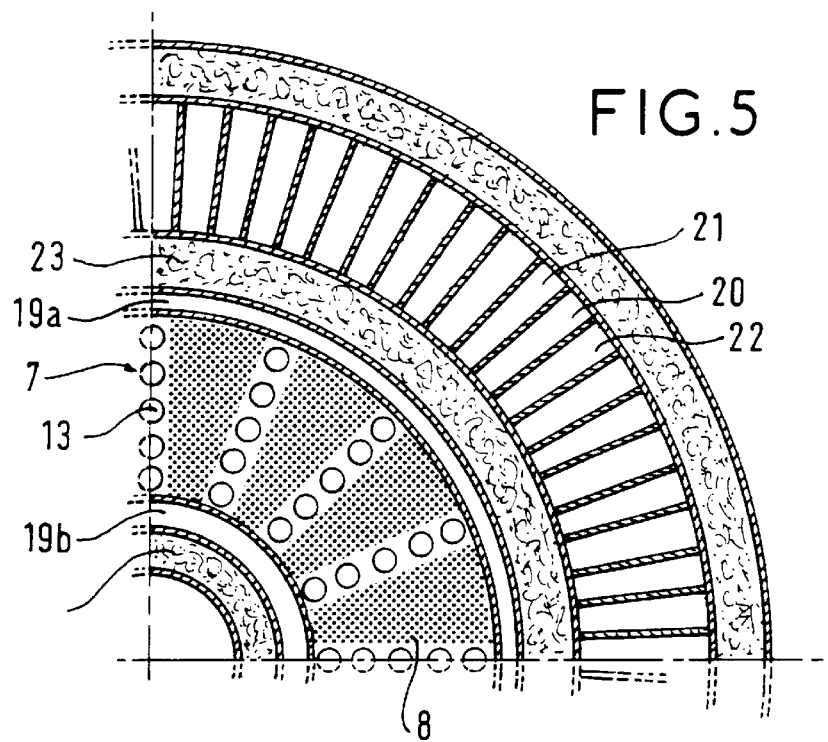
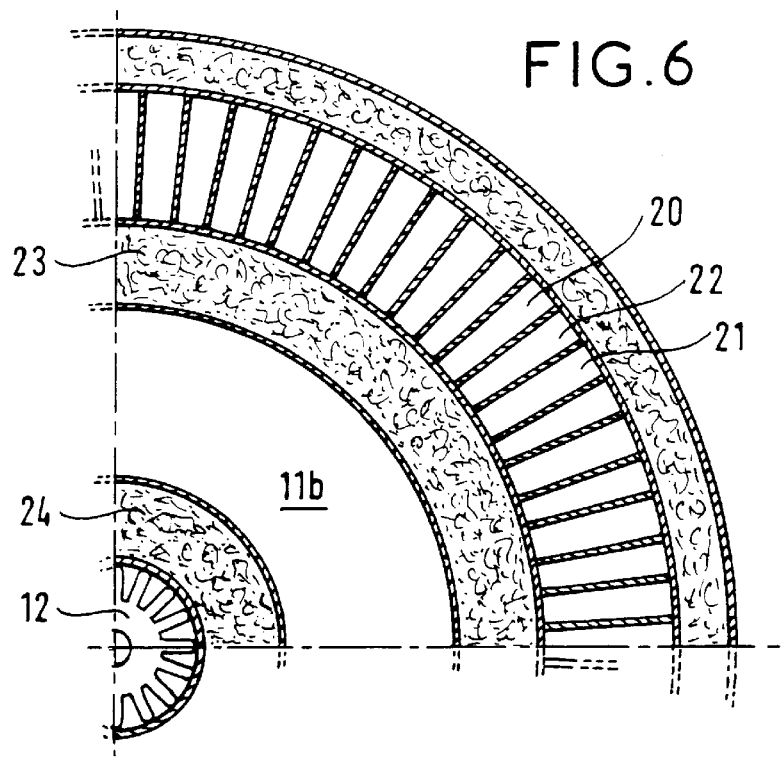

COMPACT CLOSED-LOOP BRAYTON CYCLE ROTATING MACHINE, PROPULSION SYSTEM COMPRISING A MACHINE OF THIS KIND, AND VEHICLE PROVIDED WITH PROPULSION MEANS OF THIS KIND

BACKGROUND OF THE INVENTION

1. Field of the Invention

The present invention is related to a compact closed-loop Brayton cycle rotating machine. In addition, the invention is directed to a propulsion system comprising this type of machine, and a vehicle provided with propulsion means of this kind.

2. Description of the Prior Art

The closed-loop Brayton cycle is a thermodynamic cycle in which a gas, a mixture of gases, or working fluid, referred to together hereinafter as "working fluid", flows in a closed circuit through the following stages:

the cold working fluid is compressed, the compressed cold working fluid is heated, the compressed heated working fluid is expanded, the expanded heated working fluid is cooled, and the cooled working fluid is recycled to the compressor stage, thus completing the cycle.

Various types of heat sources may heat the working fluid, such as a nuclear reactor or a boiler with burners fed with fuel oil or natural gas.

The working fluid is expanded in a turbine, or the like, so as to recover mechanical energy.

Closed-loop Brayton cycle turbines are used in nuclear power plants in which size is not critical. Furthermore, these turbines are constructed individually for a specific power plant and with higher power ratings appropriate to the substantial heat source that the specific nuclear reactor represents.

Closed-loop Brayton cycle turbines have also been developed for use in underwater craft and spacecraft. Once again, they are constructed individually at a cost that is unthinkable in the context of large series production. Furthermore, the proposed turbines always have a high power rating and/or large overall dimensions.

Turbines have been proposed having two structurally separate parts disposed one after the other or one in parallel with the other. The first part constitutes the main working fluid heating stage (boiler) and the second part constitutes the working fluid compression, preheating and expansion stages. However, this separate arrangement has disadvantages, including high head losses in the pipes conveying the working fluid between the two parts of the turbine, and loss of heat dissipated by the structures of the boiler part and along the pipes connecting the various parts. Furthermore, prior art turbines operate with temperatures in the order of 1000° C. As a result the thermal efficiency is not very high.

SUMMARY OF THE INVENTION

In view of the foregoing, an object of the present invention is to provide a closed-loop Brayton cycle rotating machine which reduces the disadvantages mentioned above.

Another object of the present invention is to provide a closed-loop Brayton cycle rotating machine having a power rating from a few tens of kW to a few hundreds of kW, that is compact, that operates at approximately 50000 rpm, and that has a heat source temperature much greater than 1000° C., notably in the order of 1500° C. This high temperature significantly increases the thermal efficiency of the turbine.

Other objects of the present invention are to provide a machine that uses non-polluting combustion at a pressure near atmospheric pressure, that can be used with a great variety of fuels without major modification, and that is silent in operation.

To achieve the abovementioned objectives, the present invention consists of a closed-loop Brayton cycle rotating machine comprising a sealed circuit in which a working fluid flows. The circuit comprises: a compressor for compressing the working fluid; a hollow cylindrical recovery heat exchanger, downstream of the compressor, for preheating the compressed working fluid; a high-temperature (H.T.) boiler downstream of the recovery heat exchanger, for heating the preheated compressed working fluid to a high temperature; a turbine downstream of the H.T. boiler, for generating mechanical energy by expanding the compressed H.T. working fluid through the turbine; and downstream of and axially aligned with the turbine, an exhaust pipe for the expanded H.T. working fluid, the expanded H.T. working fluid constituting a heat source of the recovery heat exchanger.

The boiler has a hollow cylindrical shape and is interposed coaxially between the axial turbine/exhaust pipe assembly and the recovery heat exchanger. Connecting means are provided between its upstream and downstream components.

The working fluid flows substantially in a first longitudinal direction in the recovery heat exchanger, in an opposite direction in the H.T. boiler, in the first direction in the turbine/exhaust pipe assembly and, acting as a heat source, in the opposite direction in the recovery heat exchanger.

The H.T. boiler comprises a hollow cylindrical heater body having longitudinal pipes radially passing through in which the preheated compressed working fluid flows. H.T. source generator means are provided for heating the preheated compressed working fluid flowing in the pipes to a high temperature, the pipes being upstream of the recovery heat exchanger. The preheated compressed working fluid is radially fed to the boiler and at a downstream end the inlet of the turbine distributes the compressed H.T. working fluid via radial means.

The turbine is a radial-flow turbine with a centripetal radial-flow rotor.

Other advantages and features of the present invention will emerge from the following description given with reference to the accompanying drawings.

BRIEF DESCRIPTION OF THE DRAWINGS

FIG. 5 is a diagrammatic part view in cross-section on the line V—V in FIG. 1;

FIG. 6 is a diagrammatic part view in cross-section on the line VI—VI in FIG. 1.

DETAILED DESCRIPTION OF THE INVENTION

Figure 1:
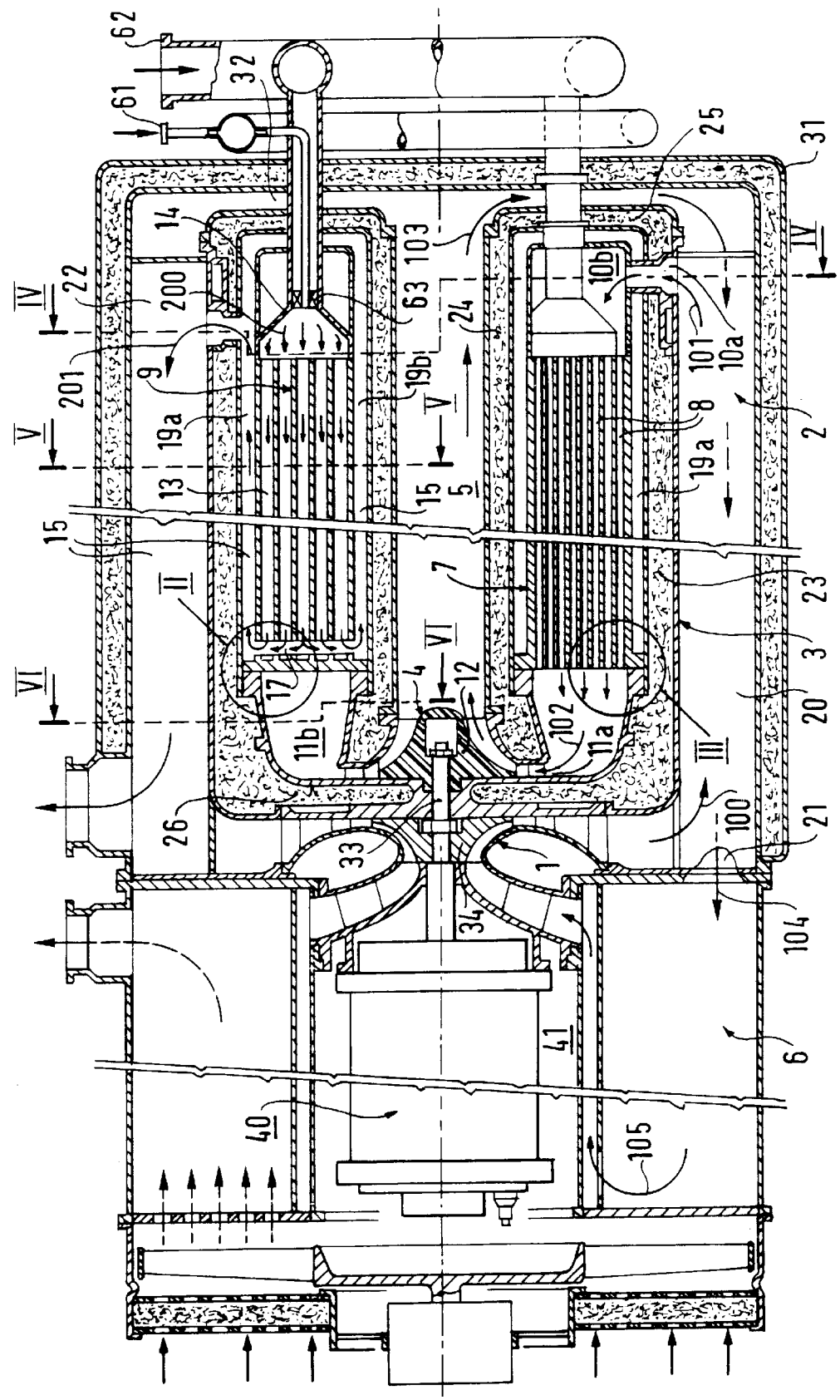
FIG. 1 is a diagrammatic elevation view of a rotating machine of the invention.

In a first embodiment, the H.T. source generator means comprise a combustion circuit independent of the sealed working fluid circuit. The combustion circuit comprises longitudinal radiant tubes in longitudinal bores along the radial thickness of the heater body, distributors for distributing an inflammable mixture into the radiant tubes and exhaust means for combustion gases produced by combustion of the inflammable mixture.

In a second embodiment, the H.T. source generator means comprise a combustion circuit independent of the sealed working fluid circuit, also. However, the combustion circuit comprises longitudinal flame tubes along the radial thickness of the heater body, distributors for distributing an inflammable mixture into the flame tubes and exhaust means for combustion gases produced by combustion of the inflammable mixture.

In the second embodiment, the direction of flow of the working fluid in the heater body is the same as the direction of flow of the inflammable mixture.

The recovery heat exchanger has a hollow, generally cylindrical shape, comprising within its radial thickness at least two sets of longitudinal flow paths sealed off from each other. Each path of a first set of paths is connected at its upstream end to the outlet of the compressor and at its downstream end to the pipes in which the preheated compressed working fluid flows. Each path of the second set of paths is connected at its upstream end to the outlet of the exhaust pipe for the expanded H.T. working fluid and at its downstream end to a cooler.

In the first embodiment, the recovery heat exchanger comprises an annular heat exchanger at the end which is axially aligned with the rotating machine and comprises radial spaces forming part of combustion gas exhaust means alternating with radial spaces in which flows the air of the inflammable mixture to be heated.

In the second embodiment, the recovery heat exchanger comprises a third set of longitudinal flow paths sealed off from the others, each path of the third set of paths being part of the exhaust means for combustion gases produced by combustion of the inflammable mixture.

In the second embodiment, the flame tubes are disposed in uniformly distributed radial series and the combustion gas exhaust means comprises a radial collector for each radial series common to the flame tubes of the radial series concerned, located downstream of the heater body, each radial collector having at least one radial end discharging into a coaxial ring for returning the exhaust gases towards the upstream end of the heater body. The return ring is connected to the paths of the third set of paths.

In all the embodiments, the H.T. boiler comprises a thermally insulated enclosure comprising an external lateral wall, an internal lateral wall, a transverse base and a solid transverse base.

The external lateral wall of the H.T. boiler constitutes the internal lateral wall of the recovery heat exchanger and has radial connecting orifices between the upstream end of the paths of the first set of paths.

The internal lateral wall of the H.T. boiler constitutes the lateral wall of the exhaust pipe and the stator of said turbine, and has a radial slot connecting the H.T. boiler and the inlet of the turbine.

The annular transverse base forms, with the external enclosure of the machine, a radial passage between the exhaust pipe and the upstream end of the paths of the second set of paths.

The thermally insulated enclosure of the boiler and/or the heater body and/or the turbine rotor are made from a carbon-based material.

The portions of the thermally insulated enclosure of the boiler and/or the heater body and/or the turbine rotor reaching a high temperature and in contact with an oxidizing atmosphere are covered with an anti-oxidant coating.

The thermally insulated enclosure of the boiler is advantageously of the type having double-walls defining a space that can be filled with a thermally insulative material. The thermally insulated space advantageously contains an inert gas at a pressure close to the pressure of the working fluid in the H.T. boiler.

The solid transverse base comprises passage for the shaft of said turbine rotor.

The compressor has a radial-flow centrifugal rotor, said rotor being mounted outside said enclosure of said boiler, fastened to the shaft of the turbine.

The machine of the invention comprises a cooler for the partially cooled, expanded working fluid, downstream of the paths of said second set of paths and upstream of said compressor.

A rotating machine of the invention drives an alternator.

The cooler is preferably of hollow cylindrical shape, longitudinally aligned with the downstream end of the paths of said second set of paths, the alternator being coaxial with the cooler, within the empty central space of the cooler.

In one embodiment the alternator is outside the enclosure of the boiler, between the solid transverse base and the compressor. The compressor and the turbine are then on opposite sides of the alternator.

In another embodiment the radial-flow centrifugal rotor of the compressor, outside the enclosure of the H.T. boiler, is near the solid transverse base of the H.T. boiler, the solid transverse base of the H.T. boiler constituting part of the radial connecting means between the outlet of the compressor and the upstream end of the paths of the first set of paths. The compressor and the turbine are then on the same side of the alternator.

In either embodiment, the bearings and the axial thrust bearing of the common shaft are advantageously located in the alternator. In this case the compressor and the turbine are mounted cantilever fashion and the bearings and the thrust bearings are located in the cold part of the machine.

The invention also consists of a propulsion system comprising a rotating machine as defined hereinabove.

The alternator generates electricity that is supplied directly or indirectly to propulsion electric motors.

The invention finally consists of a vehicle provided with a propulsion system as defined hereinabove.

A detailed description of the present invention with respect to the Figures will now be described.

The invention concerns a closed-loop Brayton cycle rotating machine. In the remainder of the description the expressions "upstream" and "downstream" are to be understood as relating to the direction of flow of the fluid flowing through the member concerned. In the remainder of the description the expression "working fluid" refers to the gas or gas mixture flowing in the closed circuits of the machine of the invention.

The closed-loop Brayton cycle rotating machine of the present invention comprises a sealed circuit in which a working fluid flows. The circuit comprises: a compressor 1 for compressing the working fluid; downstream of the compressor 1, a hollow cylindrical recovery heat exchanger 2 for preheating the compressed working fluid 100; downstream of the recovery heat exchanger 2, a high-temperature (H.T.) boiler 3 for heating the preheated compressed working fluid 101 to a high temperature; downstream of the H.T. boiler 3, a turbine 4 for generating mechanical energy by expanding the compressed H.T. working fluid 102 through said turbine 4; downstream of and axially aligned with the turbine 4, an exhaust pipe 5 for the expanded H.T. working fluid 103.

Downstream of the exhaust pipe 5, the circuit passes through the recovery heat exchanger 2 in which the expanded H.T. working fluid 103 serves as a heat source.

The expanded H.T. working fluid 103 is partially cooled in the recovery heat exchanger 2. At the outlet of the recovery heat exchanger 2 the partially cooled expanded working fluid 104 enters a cooler 6 which closes the circuit to the input of the compressor 1, to which it supplies expanded cooled working fluid 105.

In accordance with one feature of the invention, the boiler 3 has a hollow, generally cylindrical shape and is interposed coaxially between the axial turbine/exhaust pipe 4, 5 assembly and the recovery heat exchanger 2. This judicious arrangement significantly reduces the axial length of the hot part of the rotating machine compared to prior art machines of this type.

Further, to optimize the paths of the working fluid and to reduce the overall size of the machine by limiting the connecting pipes, the rotating machine of the invention comprises connecting means between its component parts such that, in the upstream to downstream direction, the working fluid flows substantially in a first longitudinal direction in the recovery heat exchanger 2, in an opposite direction in the H.T. boiler 3, in said first direction in the turbine/exhaust pipe assembly 4, 5 and, acting as a heat source 103, in said opposite direction in the recovery heat exchanger 2.

In other words, the compressed working fluid 100 is preheated as it flows through the recovery heat exchanger 2. On reaching the outlet of the recovery heat exchanger 2, the preheated compressed working fluid 101 makes a 180° turn and flows in the opposite direction inside the H.T. boiler 3. On reaching the outlet of the H.T. boiler 3, the H.T. compressed working fluid 102 makes a 180° turn and flows in the original direction through the turbine 4 and the exhaust pipe 5. Finally, on reaching the end of the exhaust pipe 5, the expanded H.T. working fluid 103 makes a 180° turn and flows in the opposite direction through the recovery heat exchanger, serving as a heat source.

The H.T. boiler 3 comprises a hollow cylindrical heater body 7 through the radial thickness of which extend longitudinal pipes 8 in which the preheated compressed working fluid 101 flows and H.T. source generator means 9 for heating to a high temperature the preheated compressed working fluid 101 flowing in the pipes 8.

The through-pipes 8 are connected at the upstream end to the recovery heat exchanger 2 by means 10a, 10b for feeding the preheated compressed working fluid 101 radially to the H.T. boiler 3; at the downstream end they are connected to the inlet of the turbine 4 by means 11a, 11b for radial distribution of the compressed H.T. working fluid 102.

The radial feed means may comprise, for example, radial orifices 10a connecting the recovery heat exchanger 2 to an annular feed member 10b disposed at the upstream end of the pipes 8 (FIG. 1).

Similarly, the means for radial distribution of the compressed H.T. working fluid 102 can, for example, comprise a collector ring 11b at the downstream end of the pipes 8 and a radial slot 11a connecting said collector ring to the inlet of the turbine 4 (FIG. 1).

The radial slot 11a may advantageously comprise nozzle vanes to orient the H.T. compressed working fluid optimally in the turbine rotor.

In the embodiment shown in FIG. 1 the turbine 4 is a radial-flow turbine with a centripetal radial rotor 12. However, for power ratings greater than 500 kW it may be beneficial to use a single-stage or multistage axial-flow turbine.

The H.T. source generator means 9 comprise a combustion circuit independent of the sealed working fluid circuit.

In one embodiment shown in the figures, the combustion circuit comprises longitudinal flame tubes 13 within the radial thickness of the heater body 7, distributors 14 for feeding inflammable mixture 200 into the flame tubes 13, and exhaust means 15 for the combustion gases 201 produced by combustion of the inflammable mixture 200.

The direction in which the preheated compressed working fluid 101 or the H.T. compressed working fluid 102 flows in the heater body 7 is advantageously the same as the direction in which the inflammable mixture 200 flows.

In a different embodiment, not shown, the combustion circuit comprises longitudinal radiant tubes housed in longitudinal bores within the radial thickness of the heater body, distributors for distributing inflammable mixture into the radiant tubes, and exhaust means for the combustion gases produced by combustion of the inflammable mixture. The operating principle of the radiant tubes is known in itself and is as follows. A radiant tube comprises an interior tube surrounded by an exterior tube. The interior tube distributes the inflammable mixture into the radiant tube and the exterior tube contains the combustion gases, is sealed off from the heater body and transfers heat by radiation towards the heater body.

In the embodiment shown in the figures the flame tubes 13 are disposed in uniformly distributed radial series 16 and the combustion gas exhaust means 15 comprise a radial collector 17 for each radial series 16 common to the flame tubes 13 of the radial series 16 concerned. Located at the downstream end of the heater body 7, each radial collector 17 has at least one radial end 18 discharging into a coaxial ring 19a, 19b for returning the exhaust gas 201 to the upstream side of the heater body 7 (FIGS. 1, 2, 4, 5, 7).

The heater body comprises two coaxial return rings 19a, 19b, namely a distal ring 19a and a proximal ring 19b.

Figure 7:
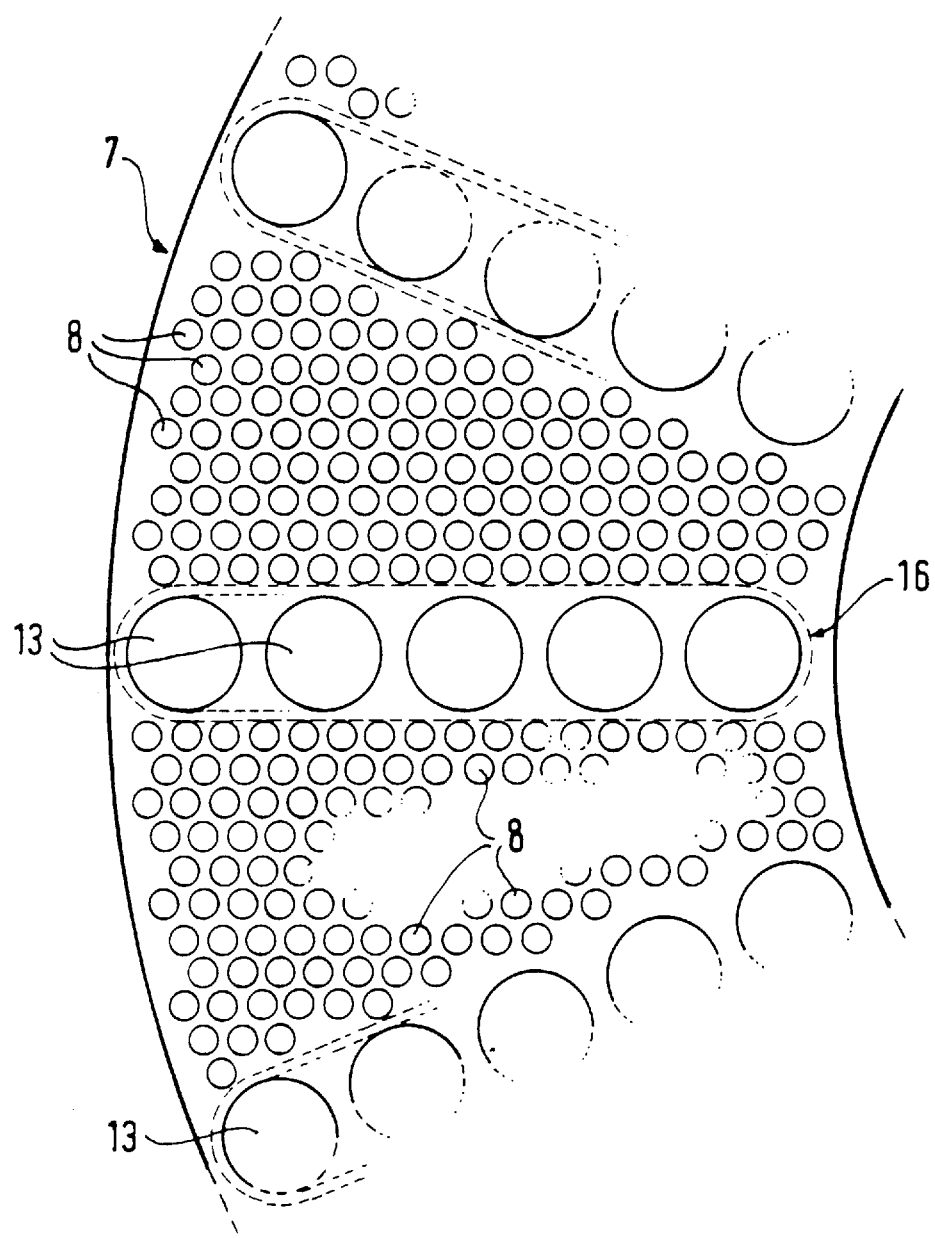
FIG. 7 shows part of FIG. 5 to a larger scale.

FIG. 7 shows the structure of the heater body 7 of the invention partly in cross-section.

Figure 2:
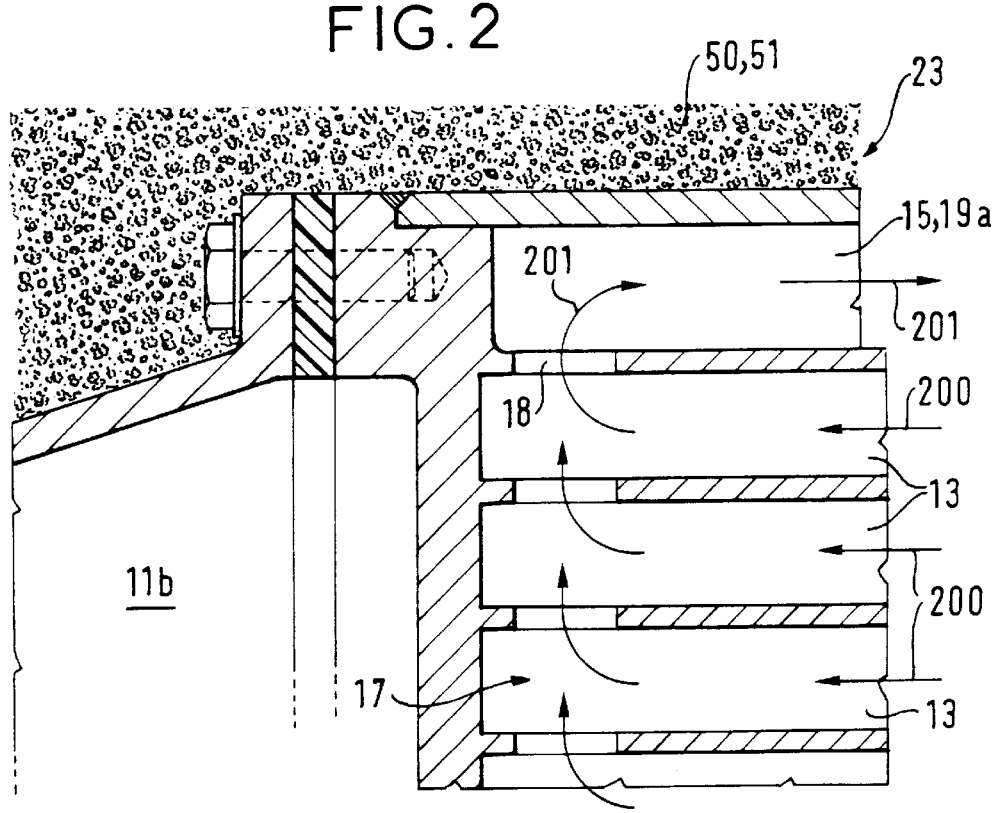
FIGS. 2 and 3 are diagrammatic views to a larger scale of the details II and III in FIG. 1.
Figure 3:
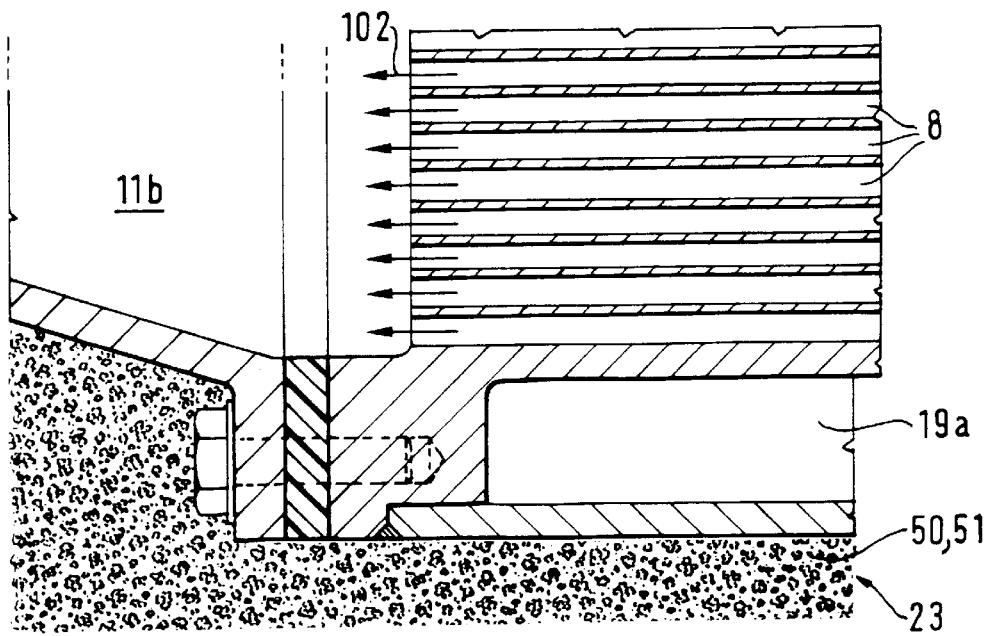

In FIG. 1 the pipes 8 are not to the same scale as the rest of the machine. Reference should be made to FIGS. 2 and 3 showing details of construction to the same scale.

Each distributor 14 as shown in FIG. 1 comprises a fuel feed 61, an air feed 62 and a mixer 63 to form the inflammable mixture 200. The working fluid cooler 6 is an air cooler and the air of the inflammable mixture 200 is preheated by taking hot air from the cooler outlet. The air feed circuit includes a blower to increase the air pressure slightly above atmospheric pressure.

The recovery heat exchanger 2 is of a hollow, generally cylindrical shape, within the radial thickness of which are provided at least two sets of longitudinal flow paths, sealed off from each other.

Each path 20 of the first set of paths is connected at the upstream end to the outlet of the compressor 1 and at the downstream end to the longitudinal pipes 8 in which the preheated compressed working fluid 101 flows.

Each path 21 of the second set of paths is connected at the upstream end to the outlet of the exhaust pipe 5 for the expanded H.T. working fluid 103 and at the downstream end to the cooler 6.

In the embodiment shown in the figures, the recovery heat exchanger 2 comprises a third set of longitudinal flow paths.

Each path 22 of the third set of paths forms part of the exhaust means 15 for the combustion gases 201 produced by combustion of the inflammable mixture 200.

In the embodiment shown in the figures each path 22 of the third set of paths is connected to the return rings 19a, 19b.

In the recovery heat exchanger shown in the figures, the paths 20, 21, 22 form alternate regions of the recovery heat exchanger. In other words, the radial thickness of the recovery heat exchanger is empty and comprises a plurality of radial walls alternately defining one of the paths 20, 21, 22.

In a different embodiment, not shown, the recovery heat exchanger comprises an annular heat exchanger at the end which is axially aligned with the rotating machine and comprises radial spaces that are part of the combustion gas exhaust means, alternating with radial spaces through which the preheated air for the inflammable mixture flows, and in which it is heated a second time.

The H.T. boiler has a thermally insulated enclosure comprising an external lateral wall 23 and an internal lateral wall 24, an annular transverse base 25 and a solid transverse base 26.

Figure 4:
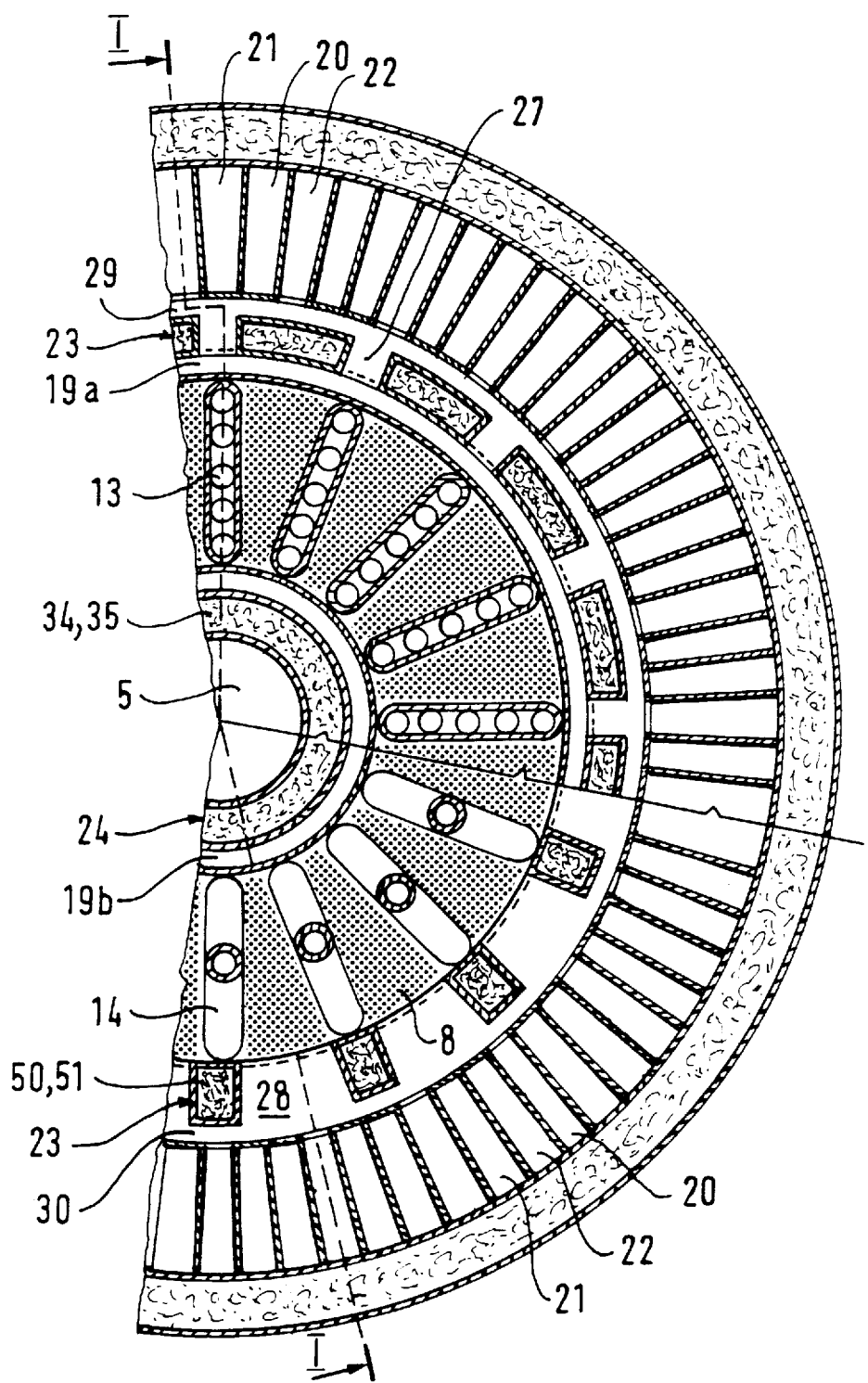
FIG. 4 is a diagrammatic part view in cross-section on the line IV—IV in FIG. 1.

The external lateral wall 23 of the H.T. boiler constitutes the internal lateral wall of the recovery heat exchanger 2 and has radial orifices 27, 28 connecting the return rings 19a, 19b and a ring 29 for feeding the paths 22 of the third set of paths (top part of FIG. 4) and the downstream ends of the paths 20 of the first set of paths and a feed ring 30 on the upstream side of the annular member lob for feeding the pipes 8 (bottom part of FIG. 4).

The internal lateral wall 24 of the H.T. boiler 3 constitutes the lateral wall of the exhaust pipe 5 and the stator of the turbine 4 and incorporates the radial slot 11a connecting the collector ring 11b at the downstream end of the pipes 8 to the inlet of the turbine 4.

In conjunction with the exterior enclosure 31 of the machine, the annular transverse base 25 forms a radial passage 32 between the exhaust pipe 5 and the upstream end of the paths 22 of the second set of paths.

The hot (>1000° C.) parts of the machine, i.e. the thermally insulated enclosure of the boiler, the heater body, the stator and the rotor of the turbine are made from a carbon-based material, for example dense graphite.

Dense graphite has good mechanical properties at high temperature provided that it is not exposed to an oxidizing atmosphere. Additionally, it is low in cost and is easy to work.

To avoid oxidation problems the dense graphite is covered with SiC in at least those parts exposed to an oxidizing atmosphere. These parts are mainly the combustion circuit 9 and, if the working fluid is not chemically neutral, the hot parts of the working fluid closed circuit. The dense graphite may be covered with SiC (silicon carbide), but this is merely one non-limiting example.

In the preferred embodiment of the invention the working fluid is a chemically neutral gas like argon or a neutral gas mixture or the like.

Accordingly, the hot parts of the closed circuit in which the working fluid flows do not need to be protected by an anti-oxidizing coating. Similarly, the turbine can be made from graphite with no coating.

The thermally insulated enclosure of the boiler may be of the double-wall type, defining a space to be filled with a thermally insulative material 50. The internal wall may be of graphite covered with antioxidant, at least in the parts where this is necessary for the mentioned reasons above.

For the reasons of oxidation mentioned previously, the thermally insulated space may comprise, in addition to a thermally insulative material, an inert gas 51 like argon. The inert gas 51 is at a pressure near the pressure of the working fluid in the H.T. boiler. This reduces the risk of breakdown of the seal between the double-wall enclosure and the working fluid closed circuit. This technique also reduces the mechanical stresses and therefore allows the use of thinner walls.

The use of a chemically neutral gas in the thermally insulated space enables the use of graphite felt as the thermally insulative material.

As graphite is porous, in the preferred embodiment the gas 51 contained in the thermally insulated space is the same as the working fluid. Accordingly, the gases being the same and at the same pressure, there is no diffusion from the thermally insulated space towards the closed circuit or vice versa.

However, some parts of the closed circuit must nevertheless be totally sealed off from the thermally insulated space. This applies in particular to the radial slot 11a and the turbine stator. To this end the graphite may be covered with pyrocarbon.

Additionally, the pipes 8 may be covered with pyrocarbon to prevent diffusion of the motor gas towards the flame tubes 13.

The machine of the invention as shown in FIG. 1 is designed to drive an alternator.

In the embodiment shown in FIG. 1 the cooler 6 has a hollow cylindrical shape, longitudinally aligned with and on the downstream side of the paths 21 of the second set of paths, and the alternator 40 is coaxial with the cooler 6, inside the empty central space 41 of the cooler 6.

The solid transverse base 26 of the H.T. boiler enclosure incorporates an axial passage 33 for the shaft of the turbine rotor 12. A seal is advantageously provided by a labyrinth device (not shown).

This sealed axial passage 33 allows the compressor 1 and the alternator 40 driven by the shaft of the turbine rotor to be mounted outside the boiler enclosure, i.e. outside the H.T. part of the machine.

The compressor 1 shown in FIG. 1 has a radial-flow centrifugal rotor 34. For powers greater than 800 kW it is preferable to use a single-stage or 25 multistage axial-flow compressor, however.

In the embodiment shown in FIG. 1, the rotor 34 is mounted outside the enclosure of the boiler 3, attached to the shaft of the turbine 4. The inlet of the compressor is sealed by a labyrinth device (not shown) mounted on the shaft.

The radial-flow centrifugal rotor 34 of the compressor, mounted outside the enclosure of the H.T. boiler 3, is near the solid transverse base 26 of the H.T. boiler 3. The solid transverse base 26 of the H.T. boiler 3 is a component part of the radial connecting means between the outlet of the compressor and the upstream end of the paths 20 of the first set of paths.

The arrangement of the turbine and the compressor reduces the risk of breakdown of the seal by reducing the pressure differences on opposite sides of certain walls. The working fluid can enter the compressor at atmospheric pressure, resulting in no pressure difference between the compressor inlet and the external environment. Also, the compressor outlet has a common wall with the boiler, so that the pressure at the compressor outlet is substantially equal to the pressure in the boiler and the turbine, again, resulting in virtually no pressure difference.

In a different configuration (not shown), the alternator is outside the boiler enclosure and between the solid transverse base and the compressor.

The alternator 40 is a high-speed alternator driven directly by the shaft of the turbine at the rotation speed of the shaft of the turbine.

In either configuration, the alternator, located in the cold part of the machine, comprises the bearings and thrust bearings required for all of the alternator/compressor/turbine common shaft. The compressor and the turbine are therefore cantilevered out from the alternator, either both on the same side (first configuration), or one on each side (second configuration).

The invention also concerns a propulsion system comprising a rotating machine as described hereinabove. The alternator generates electricity that feeds propulsion electric motors either directly or indirectly (via storage batteries).

The invention finally concerns a vehicle provided with a propulsion system of the above kind. One non-limiting example of this is a public transport vehicle of the bus type.

A first series of advantages of the present invention result from the particular arrangement of the component parts of the rotating machine. This arrangement leads to a significant reduction in the axial length of the machine and a significant reduction in the overall size of the machine. The arrangement also provides a reduction in the working fluid connecting paths between the various component parts, and therefore a reduction in the head losses caused in those paths. Use of the heat diffused by the boiler structure in the recovery heat exchanger reduces the heat losses.

The second embodiment of the turbine and the compressor reduces the risk of loss of sealing by reducing the pressure differences between opposite sides of certain walls. The working fluid can advantageously be fed into the compressor at atmospheric pressure, resulting in no pressure difference between the compressor inlet and the external environment. The compressor outlet has a common wall with the boiler, so the compressor outlet pressure is substantially equal to the pressure in the boiler and at the turbine inlet, so that as mentioned above, there is virtually no pressure difference. In the double-wall embodiment of the boiler, the resulting space containing a thermally insulative material is filled with a protective inert gas at the same pressure as the boiler, so that there is virtually no pressure difference.

The inert gas has the same advantages as the working fluid. The protective inert gas is confined within the external walls of the double-wall structure, the external walls being at moderate temperatures ($\leq 1000°$ C.).

In addition, a machine utilizing the present invention is silent compared to an open cycle machine with the same power rating. This is essentially because the invention consumes one tenth or less of the air consumed by an open cycle machine and because all of this air is used for combustion and enters the combustion chamber substantially at atmospheric pressure and at a low speed.

The speeds of the combustion gas residues at the exhaust are also in the same proportions between the two turbine stages. The speeds of the combustion gases at the exhaust are also very low in closed cycle machines compared to open cycle machines.

Of course, the invention is not limited to the embodiment described and shown and many variations will suggest themselves to the person skilled in the art that do not depart from the scope of the invention. In particular, without departing from the scope of the invention any means described hereinabove may be replaced with equivalent means. For example, the H.T. source generator means, the inflammable mixture and the materials used can be modified without departing from the scope of the invention. In particular, the carbon-based materials used can be vitreous carbon or graphite reinforced with carbon fibers.

There is claimed:

1. A closed-loop Brayton cycle rotating machine comprising:
   a sealed circuit in which a working fluid flows, said circuit comprising:
      a compressor for compressing said working fluid;
      a hollow cylindrical recovery heat exchanger for preheating the compressed working fluid, located downstream of said compressor;
      a boiler for heating the preheated compressed working fluid to a high temperature, located downstream of said recovery heat exchanger;
      a turbine for generating mechanical energy by expanding the compressed heated working fluid through said turbine, located downstream of said boiler; and
      an exhaust pipe for the expanded heated working fluid located downstream of and axially aligned with said turbine so as to form an axial turbine/exhaust pipe assembly, the expanded heated working fluid constituting a heat source of said recovery heat exchanger,
   wherein said boiler is in the general shape of a hollow cylinder and is interposed coaxially between said axial turbine/exhaust pipe assembly and said recovery heat exchanger and comprises connecting means for connecting with said recovery heat exchanger located upstream and said turbine located downstream, said working fluid flowing substantially in a first longitudinal direction in said recovery heat exchanger, in an opposite direction in said boiler, in said first direction in said turbine/exhaust pipe assembly and, acting as a heat source, in said opposite direction in said recovery heat exchanger.

2. The rotating machine claimed in claim 1 wherein said boiler comprises a hollow cylindrical heater body having longitudinal pipes passing through the radial thickness thereof, in which the preheated compressed working fluid flows, source generator means for heating the preheated compressed working fluid flowing in said pipes to a high temperature, said pipes being connected at an upstream end to said recovery heat exchanger by means for radially feeding said preheated compressed working fluid to said boiler and at a downstream end to the inlet of said turbine by means for radially distributing the compressed working fluid.

3. The rotating machine claimed in claim 2 wherein said turbine is a radial-flow turbine with a centripetal radial-flow rotor.

4. The rotating machine claimed in claim 2 wherein said source generator means comprise a combustion circuit independent of said sealed working fluid circuit, said combustion circuit comprising longitudinal flame tubes within the radial thickness of said heater body, distributors for distributing an inflammable mixture into said flame tubes and exhaust means for combustion gases produced by combustion of said inflammable mixture.

5. The rotating machine claimed in claim 4 wherein the direction of flow of said working fluid in said heater body is the same as the direction of flow of said inflammable mixture.

6. The rotating machine claimed in claim 4 wherein said recovery heat exchanger has a hollow cylindrical shape, comprising within its radial thickness at least two sets of longitudinal flow paths which are sealed off from each other, each path of a first set of paths being connected at the upstream end to the outlet of said compressor and at the downstream end to said pipes in which the preheated compressed working fluid flows, each path of a second set of paths being connected at the upstream end to the outlet of said exhaust pipe for said expanded H.T. working fluid and at the downstream end to a cooler.

7. The rotating machine claimed in claim 6 wherein said recovery heat exchanger comprises a third set of longitudinal flow paths sealed off from said first and second set, each path of said third set of paths being part of said exhaust means for combustion gases produced by combustion of said inflammable mixture.

8. The rotating machine claimed in claim 4 wherein said flame tubes are disposed in uniformly distributed radial series and said combustion gas exhaust means comprise a radial collector for each radial series common to said flame tubes of the corresponding radial series, located downstream of said heater body, each of said radial collector having at least one radial end discharging into a coaxial ring for returning the exhaust gases towards the upstream end of said heater body, said return ring being connected to said third set of paths.

9. The rotating machine claimed in claim 4 wherein said boiler comprises a thermally insulated enclosure comprising an external lateral wall, an internal lateral wall, an annular transverse base and a solid transverse base;

said external lateral wall of said boiler constituting an internal lateral wall of said recovery heat exchanger and having radial orifices between the upstream end of said paths of said first set of paths;

said internal lateral wall of said boiler constituting a lateral wall of said exhaust pipe and the stator of said turbine and having a radial slot connecting said boiler and the inlet of said turbine;

said annular transverse base forming, with an external closure of said machine, a radial passage between said exhaust pipe and the upstream end of said paths of said second set of paths.

10. The rotating machine claimed in claim 9 wherein said thermally insulated enclosure of said boiler and/or said heater body and/or said turbine rotor are made from a carbon-based material.

11. The rotating machine claimed in claim 10 wherein portions of said thermally insulated enclosure of said boiler and/or said heater body and/or said turbine rotor which are at a high temperature and in contact with an oxidizing atmosphere are covered with an anti-oxidant coating.

12. The machine claimed in claim 10 wherein portions of said H.T. boiler and/or of said turbine are covered with pyrocarbon.

13. The rotating machine claimed in claim 9 wherein said thermally insulated enclosure of said boiler has double-walls defining a space filled with thermally insulative material.

14. The rotating machine claimed in claim 13 wherein said thermally insulated space contains an inert gas at a pressure close to a pressure of said working fluid in said boiler.

15. The rotating machine according to claim 14 wherein said inert gas in said thermally insulated space has the same composition as said working fluid.

16. The rotating machine claimed in claim 9 wherein said solid transverse base comprises an axial passage for a shaft of said turbine rotor.

17. The rotating machine claimed in claim 16 wherein said compressor has a radial-flow centrifugal rotor mounted outside said enclosure of said boiler and fastened to said shaft of said turbine.

18. The rotating machine claimed in claim 17 wherein said radial-flow centrifugal rotor of said compressor, outside said enclosure of said boiler, is near said solid transverse base of said boiler, said solid transverse base of said boiler constituting part of said radial connecting means between said outlet of said compressor and the upstream end of said paths of said first set of paths.

19. The rotating machine claimed in claim 1 wherein said working fluid is a chemically neutral gas or gas mixture.

20. A rotating machine as claimed in claim 1 driving an alternator.

21. The rotating machine claimed in claim 20 wherein said cooler has a hollow cylindrical shape, longitudinally aligned with the downstream end of said paths of said second set of paths, said alternator being coaxial with said cooler, within an empty central space of said cooler.

22. The system claimed in claim 20 wherein said alternator generates electricity feeding propulsion electric motors directly or indirectly.

23. A propulsion system comprising a rotating machine as claimed in claim 1.

* * * * *